US012771795B2

(12) United States Patent
Hikichi

(10) Patent No.: US 12,771,795 B2
(45) Date of Patent: Oct. 20, 2026

(54) IMAGE FORMING APPARATUS AND POWER CONTROL METHOD FOR THE SAME

(71) Applicant: CANON KABUSHIKI KAISHA, Tokyo (JP)

(72) Inventor: Atsushi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 18/755,200

(22) Filed: Jun. 26, 2024

(65) Prior Publication Data

US 2025/0008041 A1 Jan. 2, 2025

(30) Foreign Application Priority Data

Jun. 27, 2023 (JP) ................................. 2023-104673

(51) Int. Cl.
*H04N 1/00* (2006.01)
*G06F 1/3234* (2019.01)

(52) U.S. Cl.
CPC ....... *H04N 1/00896* (2013.01); *G06F 1/3284* (2013.01)

(58) Field of Classification Search
None
See application file for complete search history.

(56) References Cited

U.S. PATENT DOCUMENTS 10,572,270 B1 * 2/2020 Sampath ............... G06F 9/4406
2018/0063349 A1 * 3/2018 Ohata ................ H04N 1/00888
2018/0181411 A1 * 6/2018 Rothman .............. G06F 1/3234
2023/0088998 A1 * 3/2023 Park ...................... G06F 9/4418
718/1

FOREIGN PATENT DOCUMENTS

JP 2015022493 A 2/2015

OTHER PUBLICATIONS

UEFI.org, ACPI Specification, retrieved 2022, https://web.archive.org/web/20220929180942/https://uefi.org/htmlspecs/ACPI_Spec_6_4_html/16_Waking_and_Sleeping/sleeping-states.html#s3-sleeping-state (Year: 2022).*
ACPI Spec 6.4 (Year: 2022).*

* cited by examiner

*Primary Examiner* — Paul Yen
(74) *Attorney, Agent, or Firm* — Canon.U.S.A., Inc. IP Division

(57) ABSTRACT

An image forming apparatus is controlled as follows. In a case where a first controller receives an end process event, the first controller that causes the image forming apparatus to transition to a power saving state causes the image forming apparatus to transition to a hibernation state in a case where transition to the hibernation state is enabled, and loads a program for a second controller into the memory and causes the image forming apparatus to transition to a suspend state in a case where transition to the suspend state is enabled.

16 Claims, 7 Drawing Sheets

IMAGE FORMING APPARATUS AND POWER CONTROL METHOD FOR THE SAME

BACKGROUND

Field of the Disclosure

The present disclosure relates to an image forming apparatus and a power control method for the image forming apparatus.

Description of the Related Art

Computers provide a plurality of functions while waiting with low power consumption, using power saving techniques including suspend, hibernation, and hybrid sleep.

Suspend achieves low power consumption by bringing a peripheral device into a stop state while applying current to a memory, and further bringing a central processing unit (CPU) into a stop state, such as the stop of a clock, wait for interrupt (WFI), or powering off. Hibernation achieves low power consumption by saving information in a memory or a register in a non-volatile storage device, stopping the application of current to the memory, a peripheral device, and a CPU, and stopping a clock.

The computer receives a power saving transition event notification, such as the expiration of a timer in a waiting state, and performs a suspend process or a hibernation process, transitioning to a power saving state, such as a sleep state or an off state where the computer can return fast (a waiting-for-fast-start state). Conversely, the computer receives a power saving return event notification in the power saving state and performs a resumption process, returning to the waiting state.

Further, hybrid sleep is a function obtained by combining suspend and hibernation, in which the computer performs suspend until a certain time elapses in the power saving state, and performs hibernation after the certain time elapses. Suspend, hibernation, and hybrid sleep are appropriately used according to the purpose or the convenience of a user and contribute to the power saving of computers.

Japanese Patent Application Laid-Open No. 2015-022493 discusses a hibernation return method for an electronic device including a main CPU and a sub CPU, and a technique for retracting and restoring data in a memory of the main CPU and the sub CPU.

SUMMARY

Suspend, hibernation, and hybrid sleep are each referred to as a "fast start mode".

Unlike computers above, an image forming apparatus includes two central processing units (CPUs), namely a main CPU that controls the system of the image forming apparatus and a sub CPU that controls image processing. Normally, the sub CPU that controls image processing is used only in image processing to execute a job. Thus, the sub CPU can transition or return faster by starting from a power-off state than by returning from the fast start mode by the time of the system saving. Thus, the image forming apparatus performs an operation different from return from the fast start mode including the sub CPU.

As the fast start mode of the image forming apparatus, conventionally, a fast start is achieved by loading programs for the sub CPU into memory before the image forming apparatus transitions to suspend. In these days when energy saving is demanded, a fast start from a hibernation state where standby power is smaller than in the suspend state draws attention. The hibernation state is sleep where current is not applied to the memory. Thus, there is an issue where in the hibernation state, return does not successfully operate at the timing of the loading of programs for the sub CPU similar to that in the suspend state.

Thus, it is necessary to make different in the timing of loading of programs into memory between the suspend state, which is sleep where current is applied to the memory, and the hibernation state, which is sleep where current is not applied to the memory.

Further, also hybrid sleep where the image forming apparatus transitions to the hibernation state in a certain time after the image forming apparatus transitions to the suspend state involves control of the timing of loading of programs for the sub CPU based on the state.

The present disclosure is directed to, in a fast start mode including suspend, hibernation, and hybrid sleep, achieving transition to and return from the fast start mode by controlling the timing of loading of programs for a sub CPU.

According to an aspect of the present disclosure, an image forming apparatus includes a first controller and a second controller that at least performs image processing, and a memory, the image forming apparatus being capable of transitioning to a normal state, a suspend state that is a power saving state where current is applied to the memory and a fast start can be made, and a hibernation state that is a power saving state where current is not applied to the memory. The image forming apparatus includes a first controller configured to, in a case where the first controller receives an end process event, cause the image forming apparatus to transition to a power saving state. In a case where the first controller determines that transition to the hibernation state is enabled, the first controller performs control to cause the image forming apparatus to transition to the hibernation state, and in a case where the first controller determines that transition to the suspend state is enabled, the first controller performs control to load a program for the second controller into the memory and then cause the image forming apparatus to transition to the suspend state.

Further features of the present disclosure will become apparent from the following description of exemplary embodiments with reference to the attached drawings.

DESCRIPTION OF THE EMBODIMENTS

Figure 1:
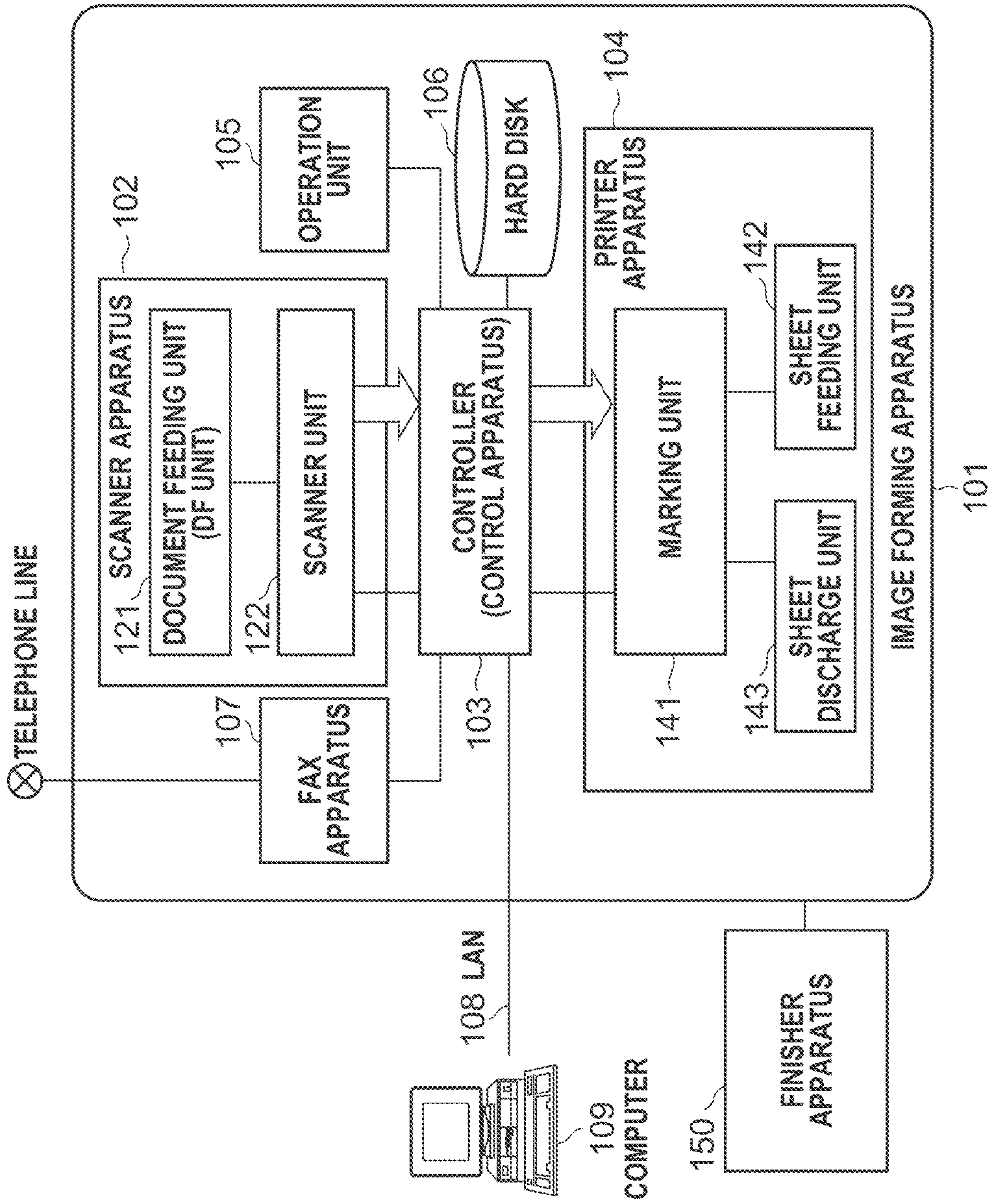
FIG. 1 is a block diagram of an image forming apparatus.

Suspend, hibernation, and hybrid sleep are each referred to as a "fast start mode" or a "power saving state where a fast start can be made". Image forming apparatuses according to exemplary embodiments are capable of transitioning to a suspend state and a hibernation state.

Since an image forming apparatus also has a server function, the state of the system of the image forming apparatus changes moment by moment even while the system is waiting. Thus, a main central processing unit (CPU) saves the previous execution state of the system and transitions to and returns from the fast start mode, making the time until a user can use the system shorter than a normal start. However, normally, a sub CPU is used in image processing to execute a job, and is not used while the system is waiting. Thus, the sub CPU can transition or return faster by making a normal start from a power-off state than by saving the previous execution state of the system and transitioning to and returning from the fast start mode by the time of the system saving. To address this situation, to cause the main CPU to transition to and return from the fast start mode, and cause the sub CPU to make a normal start, there are some issues.

For example, in the case of suspend, a main memory can be self-refreshed during suspend and hold data in itself, but a sub memory is powered off to save power. Thus, an execution program for the main CPU is stored in an inside-operating-system (OS) management area on the main memory, and an execution program for the sub CPU is stored in an outside-OS-management area on the main memory. Then, when the image forming apparatus returns from the suspend, the execution program for the sub CPU stored in the outside-OS-management area on the main memory can be loaded into the sub memory, and the sub CPU can be started.

However, in the case of hibernation, data in the main memory is retracted to a non-volatile storage device, but the data to be retracted is data in the area managed by the OS (the inside-OS-management area), and data in the area that is not managed by the OS (the outside-OS-management area) is not retracted. Since both the main memory and the sub memory are powered off, a continuous area in the outside-OS-management area on the main memory where the execution program for the sub CPU is stored is also erased. Thus, in hibernation, there is an issue where the sub CPU cannot be started after the image forming apparatus returns from hibernation.

Hybrid sleep is a function obtained by combining suspend and hibernation, in which the image forming apparatus performs suspend until a certain time elapses in the fast start mode, and the image forming apparatus performs hibernation after the certain time lapses. Hybrid sleep, however, is also similar to hibernation in that the main memory and the sub memory are powered off. Thus, there is the same issue as that of hibernation, i.e., which is that the execution program for the sub CPU is erased.

Exemplary embodiments for carrying out the present disclosure for solving the above issues will be described with reference to the drawings.

Configuration of System

FIG. 1 is a block diagram illustrating the configuration of an image forming system according to a first exemplary embodiment. In the present exemplary embodiment, a multifunction peripheral having a print function, a scanner function, and a data communication function is used as an example.

In FIG. 1, an image forming apparatus 101 is configured to receive jobs from a computer 109 via a local area network (LAN) 108. The number of computers connected to the image forming apparatus 101 can be greater than or equal to one. A scanner apparatus 102 optically reads an image from a document and converts the read image into a digital image. A printer apparatus 104 outputs a digital image to a paper device termed a "sheet". An operation unit 105 includes a touch panel and a hardware key for receiving the settings of the image forming apparatus 101 from the user and displaying the processing state of the image forming apparatus 101. A hard disk (also referred to as "HDD") 106 stores digital images and control programs. The HDD 106 is a non-volatile storage device, such as a solid-state drive (SSD) or an embedded MultiMediaCard (eMMC). A fax apparatus 107 transmits and receives digital images to and from a telephone line. A controller 103 is connected to the scanner apparatus 102, the printer apparatus 104, the operation unit 105, the hard disk 106, and the fax apparatus 107 and gives instructions to each module, executing a job on the image forming apparatus 101.

Switches for setting flags for enabling and disabling suspend, hibernation, and hybrid sleep are provided using the function of the operation unit 105 for receiving the settings of the image forming apparatus 101 from the user, making it possible to save the set flags and refer to the set flags from an application.

The image forming apparatus 101 can also input and output digital images from and to the computer 109 via the LAN 108, issue jobs, and instruct devices. The scanner apparatus 102 includes a document feeding unit 121 that automatically and sequentially replaces one document with another in a bundle of documents, and a scanner unit 122 that optically scans each document and converts the scanned image into a digital image. Image data obtained by converting the scanned image is transmitted to the controller 103.

The printer apparatus 104 includes a sheet feeding unit 142 that sequentially feeds sheets one by one from a bundle of sheets, a marking unit 141 that prints image data on the fed sheet, and a sheet discharge unit 143 that discharges the sheet after the printing. A finisher apparatus 150 performs processing, such as sheet discharge, sorting, stapling, punching, and cutting on a paper device output from the sheet discharge unit 143 of the printer apparatus 104 of the image forming apparatus 101.

Functions of System

The following is a description given below of examples of jobs (functions) that can be executed by the image forming apparatus 101.

Copy Function

The image forming apparatus 101 has a copy function for recording an image read by the scanner apparatus 102 in the hard disk 106 and simultaneously printing the image using the printer apparatus 104.

[Image Transmission Function]

The image forming apparatus 101 has an image transmission function for transmitting an image read by the scanner apparatus 102 to the computer 109 via the LAN 108.

[Image Saving Function]

The image forming apparatus 101 has an image saving function for recording an image read by the scanner apparatus 102 in the hard disk 106 and transmitting the image or printing the image, where necessary.

[Image Printing Function]

The image forming apparatus 101 has an image printing function for analyzing, for example, a page description language transmitted from the computer 109, and performing printing using the printer apparatus 104.

<Block Diagram of Controller 103>

A block diagram of the controller 103 and peripheral apparatuses will now be described with reference to FIG. 2.

The controller 103 includes a mainboard 200 and a subboard 220.

The mainboard 200 is a so-called general-purpose CPU system. The mainboard 200 includes a CPU 340 that controls the entirety of the mainboard 200, a boot read-only memory (ROM) 202 including a boot program, and a memory 341 used as a work memory by the CPU 340. The mainboard 200 also includes a bus controller 204 having a bridging function between the mainboard 200 and an external bus, and a non-volatile memory 205 in which data is not erased even if the non-volatile memory 205 is powered off. The memory 341 includes an inside-OS-management area and an outside-OS-management area. The inside-OS-management area is from a beginning address to an end address defined by the kernel and is a memory area including sections, such as text, data, bss, stack, and heap, used by the kernel or the user. In other words, the outside-OS-management area is a memory area other than the inside-OS-management area. For example, the outside-OS-management area is used for a large-capacity continuous area that should not be fragmented in the memory 341 and is used in direct memory access (DMA).

The CPU 340 also controls a watchdog timer (also referred to as "WDT") 230 that resets the controller 103. The CPU 340 controls a network controller 211 to transmit and receive data to and from the computer 109 via the LAN 108. The CPU 340 controls a real-time clock (RTC) 212 to set a current time and a return time.

Further, the mainboard 200 includes a disk controller 206 that controls storage devices, and a flash disk 207, such as an SSD or an eMMC, that is a relatively small-capacity storage device including a semiconductor device. The mainboard 200 also includes a USB controller 208 that controls a Universal Serial Bus (USB) port. A USB memory 209, the operation unit 105, and the hard disk 106 are externally connected to the mainboard 200.

The subboard 220 includes a relatively small general-purpose CPU system and image processing hardware. The subboard 220 also includes a CPU 221 that controls the entirety of the subboard 220, a memory 223 used as a work memory by the CPU 221, a bus controller 224 having a bridging function between the subboard 220 and an external bus, and a non-volatile memory 225 in which data is not erased even if the non-volatile memory 225 is powered off.

Further, the subboard 220 includes an image processor 227 that performs real-time digital image processing, and device controllers 226. The scanner apparatus 102 and the printer apparatus 104 externally connected to the controller 103 transmit and receive digital image data to and from the image processor 227 via the device controllers 226. A paper device discharged from the printer apparatus 104 is processed by the finisher apparatus 150. The fax apparatus 107 is directly controlled by the CPU 221.

Figure 2:
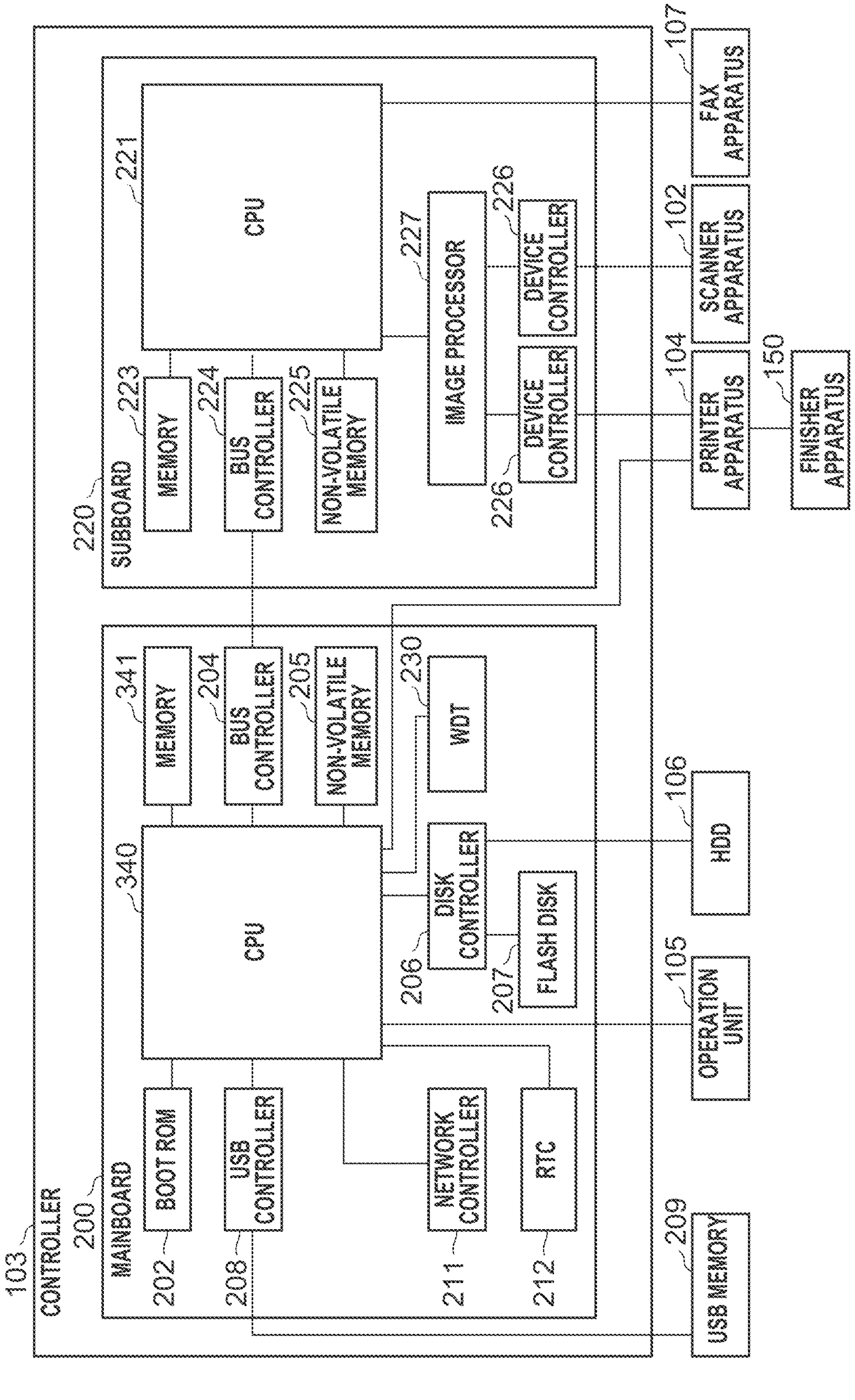
FIG. 2 is a block diagram of a controller.

FIG. 2 illustrates a block diagram in a simplified manner. For example, the CPUs 340 and 221 each include many pieces of CPU peripheral hardware, such as a chipset, a bus bridge, and a clock generator. These pieces of CPU peripheral hardware, however, are unnecessary in view of the granularity of description, and thus, the CPUs 340 and 221 are illustrated in a simplified manner. Thus, this block configuration does not limit the present disclosure.

The operation of the controller 103 will now be described using the copying of an image on a paper device as an example.

If the user gives an instruction to copy an image through the operation unit 105, the CPU 340 sends an image reading command to the scanner apparatus 102 via the CPU 221. The scanner apparatus 102 optically scans a paper document, converts the scanned image into digital image data, and inputs the digital image data to the image processor 227 via one of the device controllers 226. The image processor 227 DMA-transfers the digital image data to the memory 223 via the CPU 221 and temporarily saves the digital image data.

If the CPU 340 confirms that a certain amount or all of the digital image data is stored in the memory 223, the CPU 340 gives an image output instruction to the printer apparatus 104 via the CPU 221.

The CPU 221 notifies the image processor 227 of the address of the image data in the memory 223. The image data in the memory 223 is transmitted to the printer apparatus 104 via the image processor 227 and the other device controller 226 based on synchronization signals from the printer apparatus 104.

The printer apparatus 104 prints the digital image data on a paper device.

In printing a plurality of copies, the CPU 340 saves the image data in the memory 223 in the hard disk 106. From the second copy onward, the CPU 340 can send the image data from the hard disk 106 or the memory 223 to the printer apparatus 104 without receiving the image data from the scanner apparatus 102.

<Power Supply Configuration>

Figure 3:
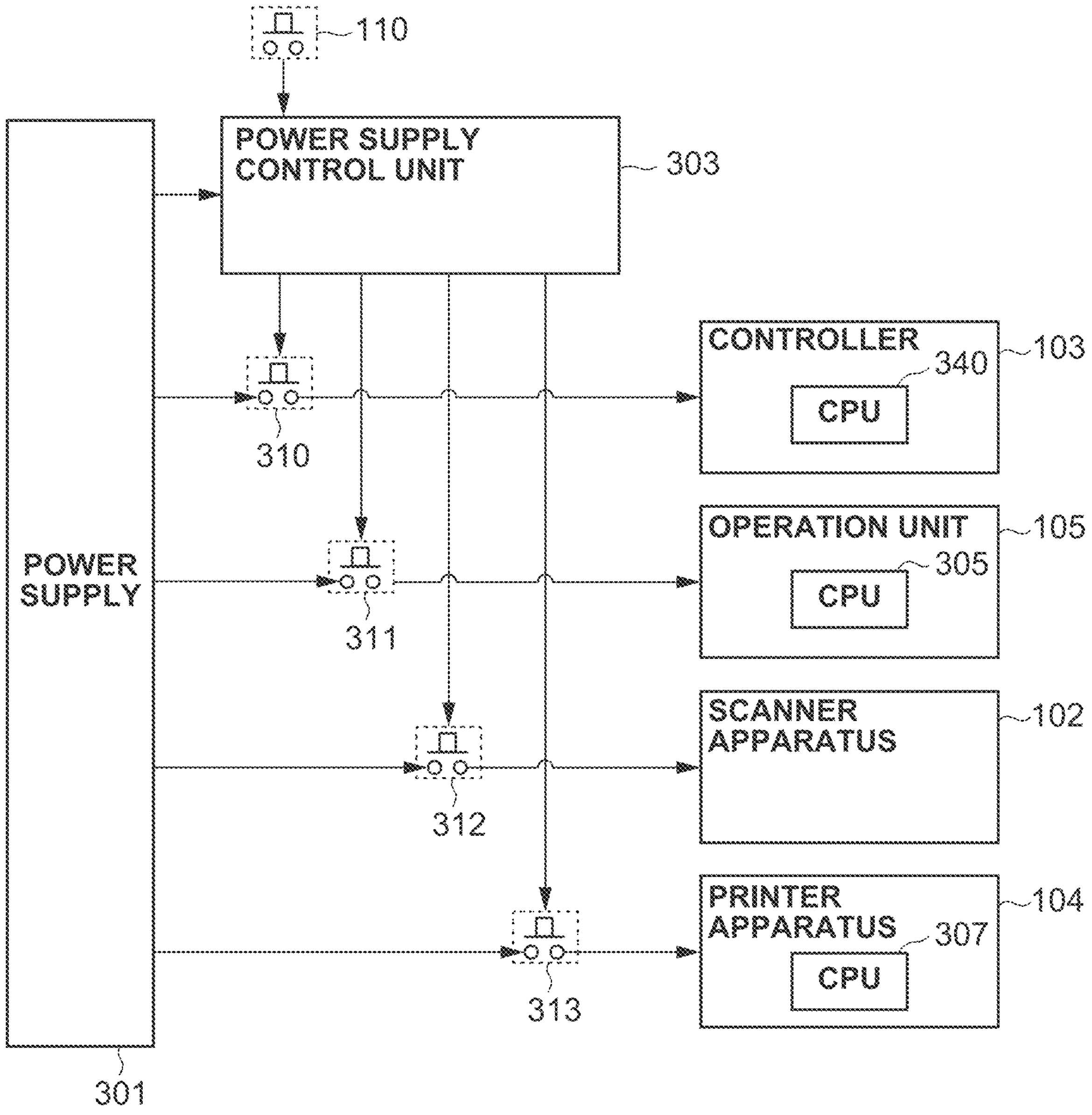
FIG. 3 is a diagram illustrating a power supply system of the image forming apparatus.

FIG. 3 is a block diagram illustrating the power supply configuration of the image forming apparatus 101 illustrated in FIG. 1. With reference to FIG. 3, configurations related to the present disclosure of a power supply 301, a power supply control unit 303, the controller 103, the operation unit 105, the scanner apparatus 102, and the printer apparatus 104 in the image forming apparatus 101 will be described. In FIG. 3, the power supply 301 always supplies power to the power supply control unit 303 via a power supply line. However, to limit the supply of power to small power consumption, power is controlled by applying current to only the power supply control unit 303 when the image forming apparatus 101 is powered off.

If a power switch 110 is pressed, the power supply control unit 303 detects the press, and the image forming apparatus 101 controls a power switch P 310 to feed power to the CPU 340 of the controller 103. Similarly, the power supply control unit 303 controls a power switch Q 311 to feed power to a CPU 305 of the operation unit 105, controls a power switch R 312 to feed power to the scanner apparatus 102, and controls a power switch L 313 to feed power to a CPU 307 of the printer apparatus 104.

The CPU 340 of the controller 103 notifies the power supply control unit 303 to control the power switch Q 311 to individually feed power to the CPU 305 of the operation unit 105. Simultaneously, the CPU 340 of the controller 103 can also control the power switch R 312 to individually feed power from the power supply 301 to the scanner apparatus 102, and control the power switch L 313 to individually feed power from the power supply 301 to the CPU 307 of the printer apparatus 104.

At this time, it is also possible to individually control the supply of power to the marking unit 141, the sheet feeding unit 142, and the sheet discharge unit 143 of the printer apparatus 104. However, this is digressive, and thus is not described. The feeding of power to each block as illustrated in FIG. 3 can be achieved by, for example, equipping the power switch P 310 with two channels, and turning off only a relay switch in one of the channels that is connected to a block to be powered off and leaving a relay switch in the other channel on in a sleep state. In a shutdown state, the relay switches in both channels are turned off. In this case, a power supply control signal is not a two-valued control signal but a multi-valued control signal according to the current application state. Although such a description is not particularly given in this example, power is supplied by such control in power states including the sleep state and the shutdown state. In this control, the power supply control unit 303 can perform multi-valued control of the power switch P 310 to feed power to the blocks of the controller 103. This control can be performed in any form. For example, the CPU 340 of the controller 103 can notify the power supply control unit 303 and perform multi-valued control of the power switch P 310 to feed power to the blocks of the controller 103.

<Feeding of Power from Power Supply Control Unit 303 when Image Forming Apparatus 101 Restarts>

A restart process of the image forming apparatus 101 will now be described. The CPU 340 of the controller 103 of the image forming apparatus 101 receives a reboot event in a waiting state after a start. The reboot event can be issued by an application operating on the CPU 340, or can be received from the computer 109 via the LAN 108 by the CPU 340.

Next, the CPU 340 performs an end process of the application and the process of saving information in the memory 341 in the HDD 106. The CPU 340 also performs an end process of peripherals and an end process of the printer apparatus 104, the scanner apparatus 102, the fax apparatus 107, and the finisher apparatus 150. The CPU 340 notifies the power supply control unit 303 and transitions to a power-off state.

In the power-off state, the power supply control unit 303 turns off the power switches 310, 311, 312, and 313. As a result, the power supply control unit 303 terminates the application of current to the controller 103, the printer apparatus 104, the scanner apparatus 102, the fax apparatus 107, and the finisher apparatus 150. The power supply control unit 303 waits the time until an analog signal of the power supply 301 becomes weak and the power supply 301 is completely turned off. Regarding the powering off of the devices, the devices can also be reset instead of being powered off, shortening the time to wait for the signal. However, this is digressive, and thus is not described.

Next, the power supply control unit 303 turns on the power switches 310, 311, 312, and 313 and applies current to the controller 103, the printer apparatus 104, the scanner apparatus 102, the fax apparatus 107, and the finisher apparatus 150. The CPU 340 of the controller 103 performs a start process and performs an initialization process of the peripherals. The printer apparatus 104, the scanner apparatus 102, the fax apparatus 107, and the finisher apparatus 150 also perform their start process.

<Feeding of Power from Power Supply Control Unit 303 when Image Forming Apparatus 101 Transitions to Sleep>

A sleep transition process of the controller 103 will now be described. If an active state where the user does not use the image forming apparatus 101 continues for a certain time, the CPU 340 transitions to the sleep state with an auto sleep timer. The CPU 340 notifies the power supply control unit 303 of the transition to the sleep state and changes the feeding of power to the controller 103.

As described above, the feeding of power to each block is achieved by, for example, mounting relay switches 310 in two channels, turning off only one of the relay switches 310 that is connected to a block to be powered off and leaving the other relay switch 310 on in the sleep state. At this time, the CPU 340 notifies the power supply control unit 303, turns off the power switch Q 311, and stops the feeding of power from the power supply 301 to the operation unit 105 to also transition to the sleep state.

At this time, the CPU 340 also notifies the CPU 305 of the operation unit 105 through serial communication, and the CPU 305 of the operation unit 105 brings an operation panel or peripherals into a power saving state to also transition to the sleep state. Similarly, the scanner apparatus 102 and the printer apparatus 104 can also sleep. However, this is digressive, and thus is not described.

<Feeding of Power from Power Supply Control Unit 303 when Image Forming Apparatus 101 Sleeps>

The sleep state of the image forming apparatus 101 will now be described. The sleep state is the state where, while the amount of power consumption is reduced, the start time can be made earlier than when a normal start is made. When a certain time elapses in the state where the user does not operate the image forming apparatus 101, when the touch panel or a power saving key of the operation unit 105 is pressed, or when a set time arrives, the image forming apparatus 101 transitions to the sleep state. In the sleep state, power is fed to the memory 341, an interrupt controller, the network controller 211, the RTC 212, and the USB controller 208 of the controller 103. Power is also fed to the power saving key of the operation unit 105, a part of the fax apparatus 107, and various sensors. A sleep return trigger, however, differs depending on the system, and thus, the feeding of power in the sleep state is not limited to this configuration.

<Feeding of Power from Power Supply Control Unit 303 when Image Forming Apparatus 101 Returns from Sleep>

The operation of software will now be described when the image forming apparatus 101 returns from the sleep. During the sleep, the power supply control unit 303 receives one or more interrupts from the network, the RTC 212 that detects a timer and an alarm, the fax apparatus 107 that detects reception and an off-hook state, a software switch, the various sensors, and the USB port that detects insertion and removal and communication. Then, the power supply control unit 303 starts feeding power. More specifically, the interrupts refer to the opening and closing of the cover of a front door of the printer apparatus 104, the insertion and removal of print sheets into and from a manual feeding unit of the printer apparatus 104, the opening and closing of a pressure plate of the scanner apparatus 102, and the detection of a document by an auto document feeder of the scanner apparatus 102. Further, the interrupts refer to the detection of a card by a near-field communication (NFC) card reader, the detection of a human sensor, an off-hook state of a fax handset, and the reception of a fax. The power supply control unit 303 notifies the CPU 340 of the sources of the interrupts, and the CPU 340 receives the notification and performs the process of returning the state of the software to a normal state, i.e., a sleep return process.

The sleep return process of the controller 103 will now be described. If the power supply control unit 303 receives an event handler for the pressing of the power saving key as one of sleep return triggers during the sleep, the power supply control unit 303 turns on the power switch 310 and returns the CPU 340 of the controller 103 from the sleep. At this time, for example, the power supply control unit 303 performs multi-valued control of the power switch 310 to feed power to the blocks of the controller 103. Further, the power supply control unit 303 can also return the CPU 340 from the sleep by issuing an interrupt signal. However, this complicates the sequence and is digressive, and thus is not described. The CPU 340 notifies the power supply control unit 303, and the power supply control unit 303 turns on the power switches 311, 312, and 313 and feeds power to the operation unit 105, the scanner apparatus 102, and the printer apparatus 104. The feeding of power to a device, such as the fax apparatus 107, is not illustrated, but can also be prepared as a signal (not illustrated).

While the above sleep return trigger is the pressing of the power saving key, the image forming apparatus 101 can also return from the sleep with packets on the network and process packets on the network in a sleep intermediate state. If the power supply control unit 303 receives a packet on the network as a sleep return trigger during the sleep, the power supply control unit 303 turns on the power switch 310 and returns the CPU 340 of the controller 103 from the sleep. At this time, if the received packet on the network is interpreted as a print job, the CPU 340 notifies the power supply control unit 303, and the power supply control unit 303 turns on the power switch 313 and feeds power to the printer apparatus 104. In this case, the power supply control unit 303 can perform processing without feeding power either to the operation unit 105 or the scanner apparatus 102. That is, it is sufficient that the power supply control unit 303 does not feed power to the operation unit 105 when the user does not use the touch panel. It is also sufficient that the power supply control unit 303 does not feed power to the printer apparatus 104 and the scanner apparatus 102 when a print job is not generated or when it is not necessary to acquire device information.

<Feeding of Power from Power Supply Control Unit 303 when Image Forming Apparatus 101 Enters Sleep Again>

If copying by the user or a print job via the network ends, the CPU 340 transitions to the sleep state again. That is, the CPU 340 notifies the power supply control unit 303 of the transition to the sleep. Based on a power supply control signal, the power supply control unit 303 turns off the power switches 311, 312, and 313 to stop the feeding of power to the apparatuses other than the controller 103. At this time, for example, the power supply control unit 303 brings the CPU 340 into a waiting-for-interrupt-signal state, performs multi-valued control of the power switch 310, and turns off the blocks of the controller 103 to also bring the CPU 340 into the sleep state. However, this complicates the sequence and is digressive, and thus is not described.

<Feeding of Power from Power Supply Control Unit 303 in Fast Start Mode>

Suspend is a power saving state where the state is held by applying current to memory, and can be used in the sleep state and the fast start mode. The CPU 340 of the mainboard 200 is referred to as the "main CPU 340". The memory 341 of the mainboard 200 is referred to as the "main memory 341". The CPU 221 of the subboard 220 is referred to as the "sub CPU 221". The memory 223 of the subboard 220 is referred to as the "sub memory 223".

The main memory 341 holds an inside-OS-management area and an outside-OS-management area on the main memory 341.

If the power switch 110 is turned off, the power supply control unit 303 notifies the CPU 340. The CPU 340 loads an execution program for the sub CPU 221 from the non-volatile storage device 106 into a continuous area to DMA-transfer the execution program for the sub CPU 221 to the outside-OS-management area on the main memory 341 and notifies the power supply control unit 303. The power supply control unit 303 performs multi-valued control of the power switch 310 to power off the sub CPU 221 and the sub memory 223. Simultaneously, the power supply control unit 303 also brings the main memory 341 into a self-refreshed state where power is saved by decreasing the refresh rate. Consequently, the CPU 340 brings the controller 103 into the suspend state.

Next, if the power switch 110 is turned on, the power supply control unit 303 releases the main memory 341 from the self-refreshed state and powers on the sub CPU 221 and the sub memory 223, returning from the suspend state. The main CPU 340 DMA-transfers the execution program for the sub CPU 221 loaded into the outside-OS-management area on the main memory 341 before performing suspend to the sub memory 223 and clears the reset of the sub CPU 221. As a result, the sub CPU 221 reads the program in the sub memory 223 and starts.

A trigger for transition to or return from the suspend state is not limited to the turning on and off of a power switch, and the image forming apparatus 101 can also transition based on a software event. However, this is digressive, and thus is not described.

<Description of Fast Start Mode as Sleep State and Off State>

The fast start mode as the sleep state described with reference to FIG. 3 is a form of suspend performed with the reception of a state transition event as a trigger. The fast start mode as the off state described with reference to FIG. 3 is a form of suspend performed with the turning off of the power switch as a trigger. The suspend in the fast start mode as the sleep state and the suspend in the fast start mode as the off state are different from each other in power value because the image forming apparatus 101 waits by stopping the feeding of power to a peripheral chip and an IP Core (Intellectual Property Core) that are not used to return, and stopping a clock, but the same basic sequence is used.

The times of entry to and return from the fast start mode are shorter in suspend and longer in hibernation according to the presence or absence of the times of the retraction and the restoration of the memory. Thus, the fast start mode as the sleep state in FIG. 3 has been described as a form of suspend performed using a software event as a trigger. The fast start mode as the off state in FIG. 3 has been described as a form of suspend performed using the turning off of the power switch as a trigger.

The fast start mode is described as a form of suspend, hibernation, or hybrid sleep that starts using the turning off of the power switch as a trigger. Since suspend is described with reference to FIG. 3, hibernation will be mainly described with reference to FIGS. 4 and 5, and hybrid sleep will be mainly described with reference to FIGS. 6A, 6B, and 7.

The times of the retraction and the restoration of the memory are short in suspend because the data in the memory is not retracted, and are long in hibernation because the data in the memory is retracted. Regarding the power saving of the memory, power consumption is high in suspend because the data in the memory is not retracted and the supply of power cannot be turned off. Power consumption is low in hibernation because the data in the memory is retracted and the supply of power can be turned off. As a trigger for a start, the reception of a state transition event, as well as the turning off of the power switch, can be used. Thus, the fast start mode can be substituted according to a design policy, such as giving priority to the times of transition and return or giving priority to power consumption. However, this is digressive, and thus is not described.

Description of Flowcharts According to First Exemplary Embodiment

Figure 4:
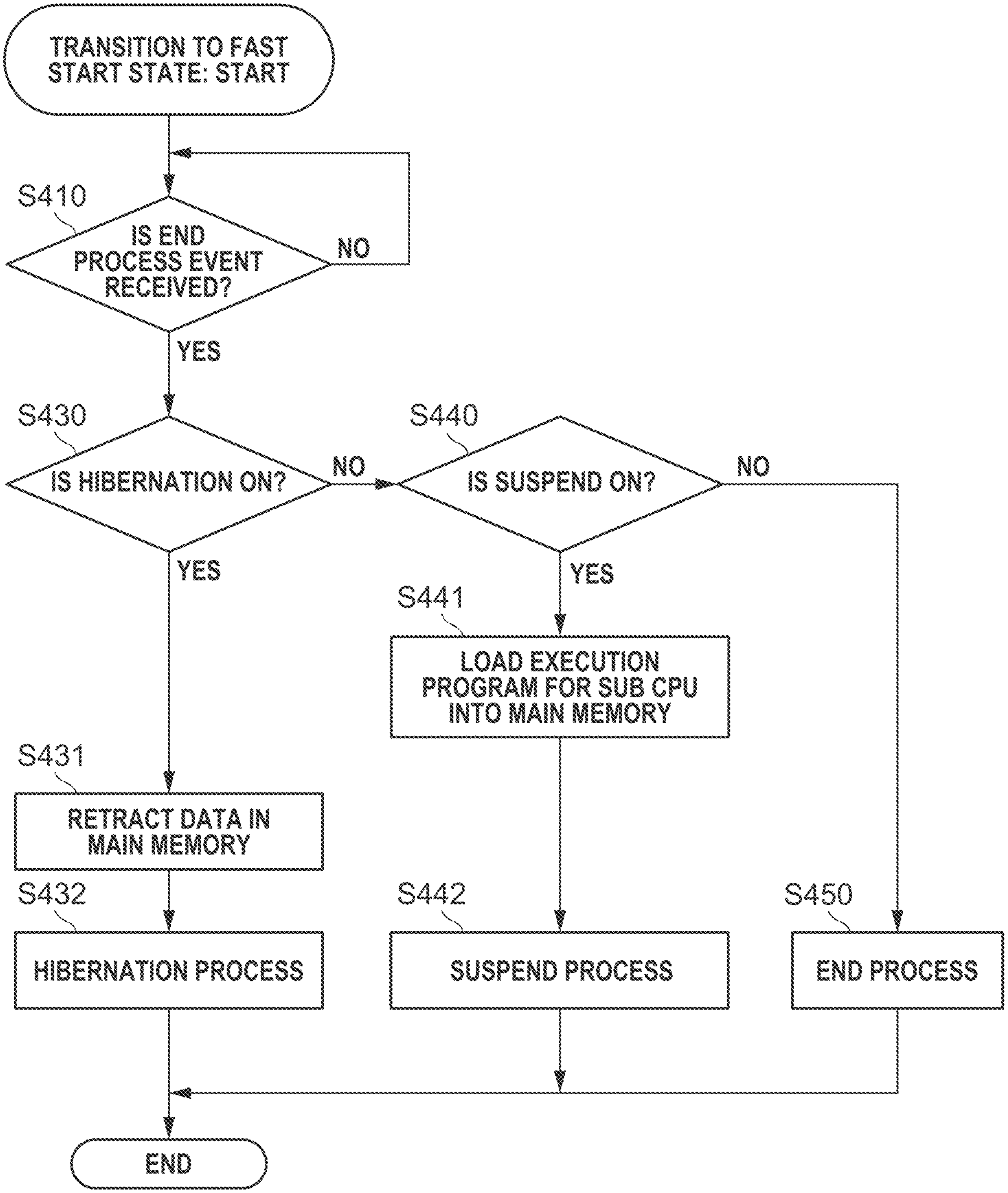
FIG. 4 is a flowchart according to one or more aspects of the present disclosure.
Figure 5:
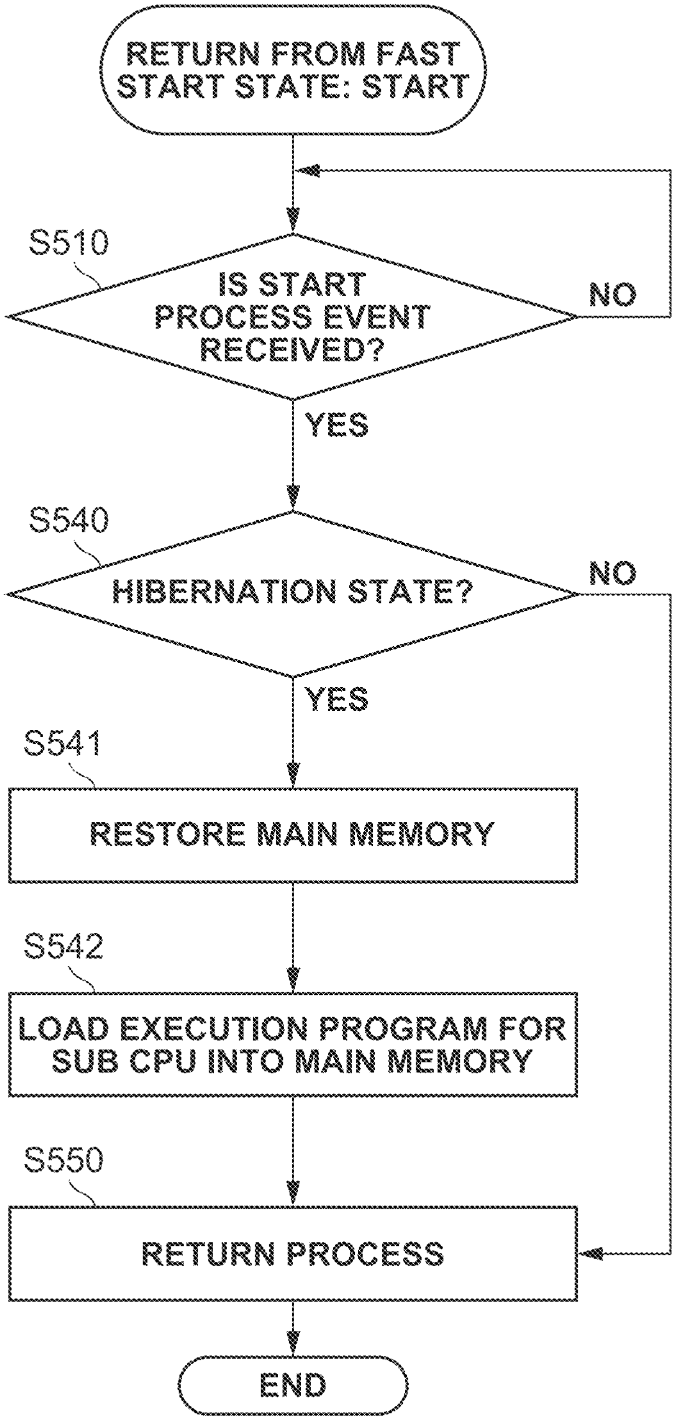
FIG. 5 is a flowchart according to one or more aspects of the present disclosure.

FIG. 4 illustrates a flowchart according to the first exemplary embodiment in which the image forming apparatus 101 transitions to hibernation and suspend. FIG. 5 illustrates a flowchart according to the first exemplary embodiment in which the image forming apparatus 101 returns from hibernation and suspend. The CPU 340 of the mainboard 200 is referred to as the "main CPU 340". The memory 341 of the mainboard 200 is referred to as the "main memory 341". The CPU 221 of the subboard 220 is referred to as the "sub CPU 221". The memory 223 of the subboard 220 is referred to as the "sub memory 223". The main memory 341 holds an inside-OS-management area and an outside-OS-management area on the main memory 341. Hibernation is a power saving state where data and a register in the inside-OS-management area on the main memory 341 are retracted, and the main memory 341 is powered off.

A sequence with an issue will be described. Before the main CPU 340 transitions to the hibernation state, the main CPU 340 loads the execution program for the sub CPU 221 into the outside-OS-management area on the main memory 341, similarly to suspend. The main CPU 340 does not save the execution program for the sub CPU 221 in the outside-OS-management area on the main memory 341 in the non-volatile storage device 106. As a result, the execution program for the sub CPU 221 is erased by the main CPU 340 transitioning to the hibernation state as simultaneously powering off the main memory 341.

Thus, return from hibernation is different from return from suspend in that when the image forming apparatus 101 starts, the main CPU 340 determines whether the image forming apparatus 101 returns from hibernation, and the main CPU 340 loads the execution program for the sub CPU 221 into the outside-OS-management area on the main memory 341 and further loads the execution program for the sub CPU 221 into the sub memory 223.

The flowchart in FIG. 4 will now be described. The main CPU 340 of the image forming apparatus 101 starts in a waiting state where an end process event can be received. In step S410, the main CPU 340 receives an end process event for the system, such as the detection of the turning off of the power switch 110, which is one of end process events (YES in step S410). The end process events include transition to a waiting state where a fast start can be made, a shutdown, and a reboot.

If the end process event received by the main CPU 340 is transition to the waiting state where a fast start can be made, and in step S430, if hibernation is enabled (on) (YES in step S430), then in step S431, the main CPU 340 saves data and information regarding a register of the main CPU 340 in the inside-OS-management area on the main memory 341 in the non-volatile storage device 106. The data saved in the non-volatile storage device 106 is referred to as a "hibernation image".

Then, in step S432, the main CPU 340 notifies the power supply control unit 303. The power supply control unit 303 performs multi-valued control of the power switch 310 to power off the sub CPU 221 and the sub memory 223 and power off the main memory 341. Consequently, the CPU 340 causes the controller 103 to transition to the hibernation state.

If the end process event received by the main CPU 340 is an event corresponding to transition to the waiting state where a fast start can be made, and in step S430, if the hibernation is disabled (off) (NO in step S430), and in step S440, if suspend is enabled (on) (YES in step S440), the processing proceeds to step S441. In step S441, the main CPU 340 loads the execution program for the sub CPU 221 into the outside-OS-management area on the main memory 341. Then, in step S442, the main CPU 340 notifies the power supply control unit 303 and causes the system to transition to the suspend state. That is, before the system transitions to the suspend state, the main CPU 340 loads the execution program for the sub CPU 221 into the outside-OS-management area on the main memory 341. Further, in steps S430 and S440, if the received end process event is not transition to the waiting state where a fast start can be made, but a shutdown or a reboot (NO in step S430 and NO in step S440), then in step S450, the main CPU 340 performs an end process. Then, the main CPU 340 notifies the power supply control unit 303 and causes the system to transition to an end state.

A supplementary description will be given of the flowchart of entry to hibernation in FIG. 4. The end process event for the system (step S410) is not limited to the turning off of the power switch 110. The end process event can be in any form. For example, the CPU 340 can start the processing based on a system operation, or based on an event received from the computer 109 via the LAN 108 or via the telephone line. Examples of the system operation include an auto shutdown timer and an auto shutdown time by the RTC 212 and an external remote shutdown. The descriptions of these examples, however, are digressive, and thus are omitted.

The determination of whether hibernation is enabled (on) (step S430) can be made by the main CPU 340 referring to the flag for enabling and disabling hibernation. The flag for enabling and disabling hibernation is a system initial setting value or is saved in the non-volatile storage device 106 or a memory by the user providing an input to the operation unit 105. The determination of whether hibernation is enabled (on) (step S430) can also be made with information regarding the flag included in the end process event for the system received by the main CPU 340 (step S410). These determinations are not limited to hibernation, and can also be similarly made regarding another function, such as suspend. However, this is digressive, and thus is not described.

FIG. 5 illustrates a flowchart according to the first exemplary embodiment in which the image forming apparatus 101 returns from hibernation, and illustrates the feature of the present disclosure most clearly. The flowchart in FIG. 5 will now be described. The main CPU 340 of the image forming apparatus 101 starts in a waiting state where a start event can be received, i.e., the fast start mode or the power-off state.

In step S510, the main CPU 340 receives a start process event for the system (YES in step S510). If the power switch 110 is turned on, the power supply control unit 303 starts a start process of the main CPU 340.

Next, in step S540, the main CPU 340 determines whether the image forming apparatus 101 returns from the hibernation state. If the image forming apparatus 101 returns from the hibernation state (Yes in step S540), then in step S541, the main CPU 340 loads a hibernation image saved in the non-volatile storage device 106 before hibernation into the inside-OS-management area on the memory 341 for the main CPU 340 and restores the register of the main CPU 340.

Next, in step S542, the main CPU 340 loads the execution program for the sub CPU 221 into the outside-OS-management area on the main memory 341. That is, if the image forming apparatus 101 returns from the hibernation state, the main CPU 340 loads the execution program for the sub CPU 221 into the main memory 341 after current is applied to the main memory 341. Then, the main CPU 340 DMA-transfers the execution program for the sub CPU 221 in the outside-OS-management area to the sub memory 223 and clears the reset of the sub CPU 221. As a result, in step S550, the sub CPU 221 reads the program in the sub memory 223 and starts. On the other hand, if the image forming apparatus 101 does not return from the hibernation state (No in step S540), the image forming apparatus 101 returns from the suspend state. Thus, the processing proceeds to step S550.

A supplementary description will be given of the flowchart of return from hibernation in FIG. 5. The start process event for the system (step S510) is not limited to the turning on of the power switch 110. The start process event may be in any form. For example, the CPU 340 can start the processing based on a system operation, or based on an event received from the computer 109 via the LAN 108 or via the telephone line. Examples of the system operation include an auto boot timer and an auto boot time by the RTC 212 and an external remote boot. The descriptions of these examples, however, are digressive, and thus are omitted.

Examples of the method for determining whether the power state before the return is the hibernation state (step S540) include the determination of the presence or absence of the setting of the enabling or disabling of hibernation, the determination of the presence or absence of a hibernation image, and the determination of the presence or absence of the flag in the non-volatile storage device 106.

Effects of First Exemplary Embodiment

As the effects of the first exemplary embodiment, the main CPU 340 can return from hibernation, allowing the sub CPU 221 to normally start. As a result, the controller 103 can start fast from hibernation.

A second exemplary embodiment will be described.

Description of Flowcharts According to Second Exemplary Embodiment

Figure 6A:
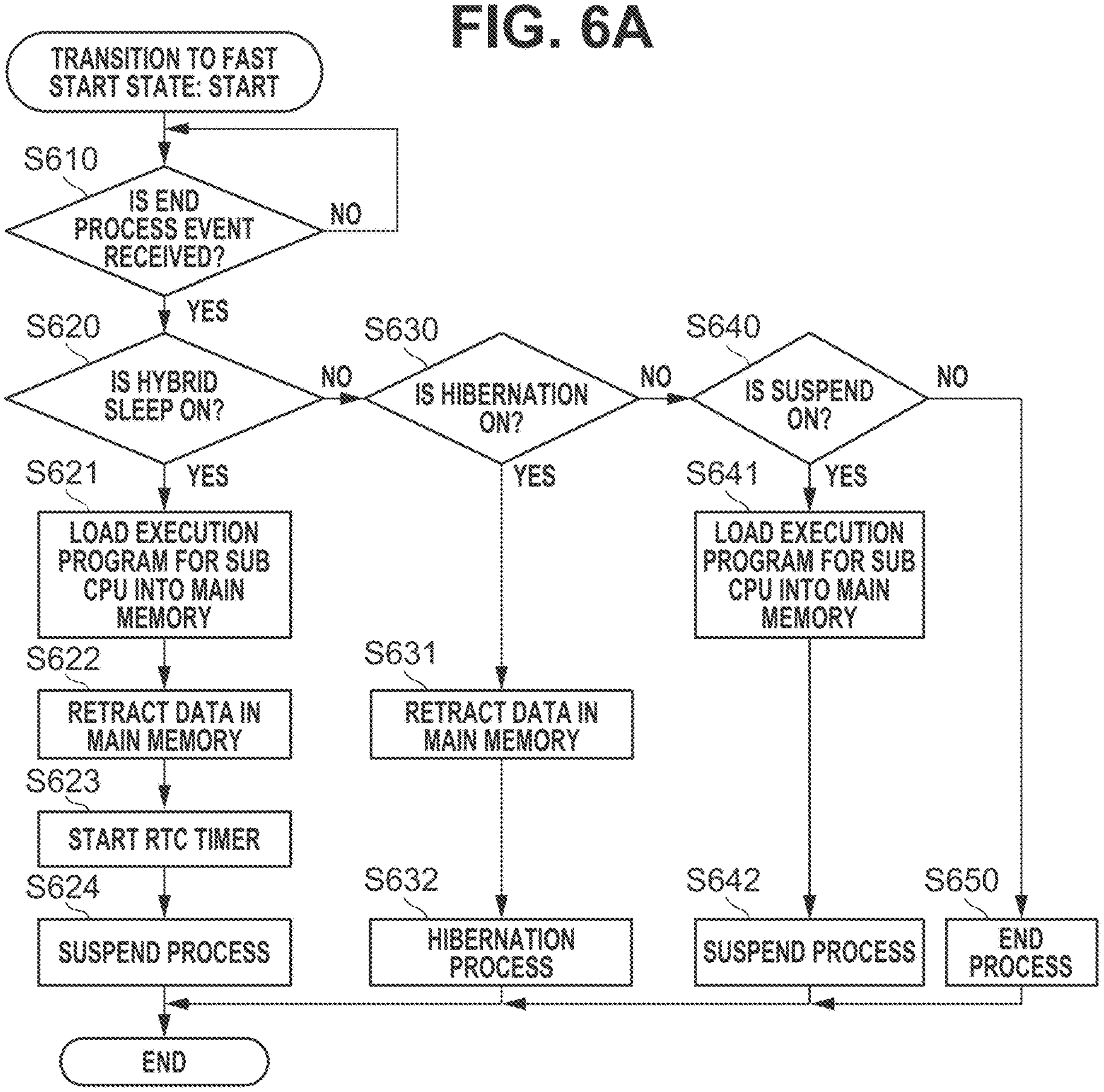
FIGS. 6A and 6B are flowcharts according to one or more aspects of the present disclosure.
Figure 6B:
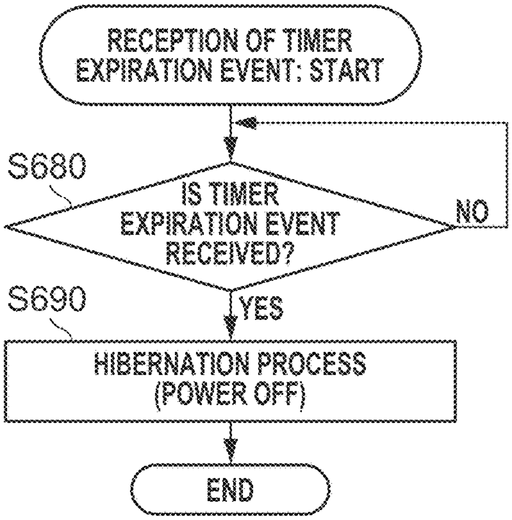
Figure 7:
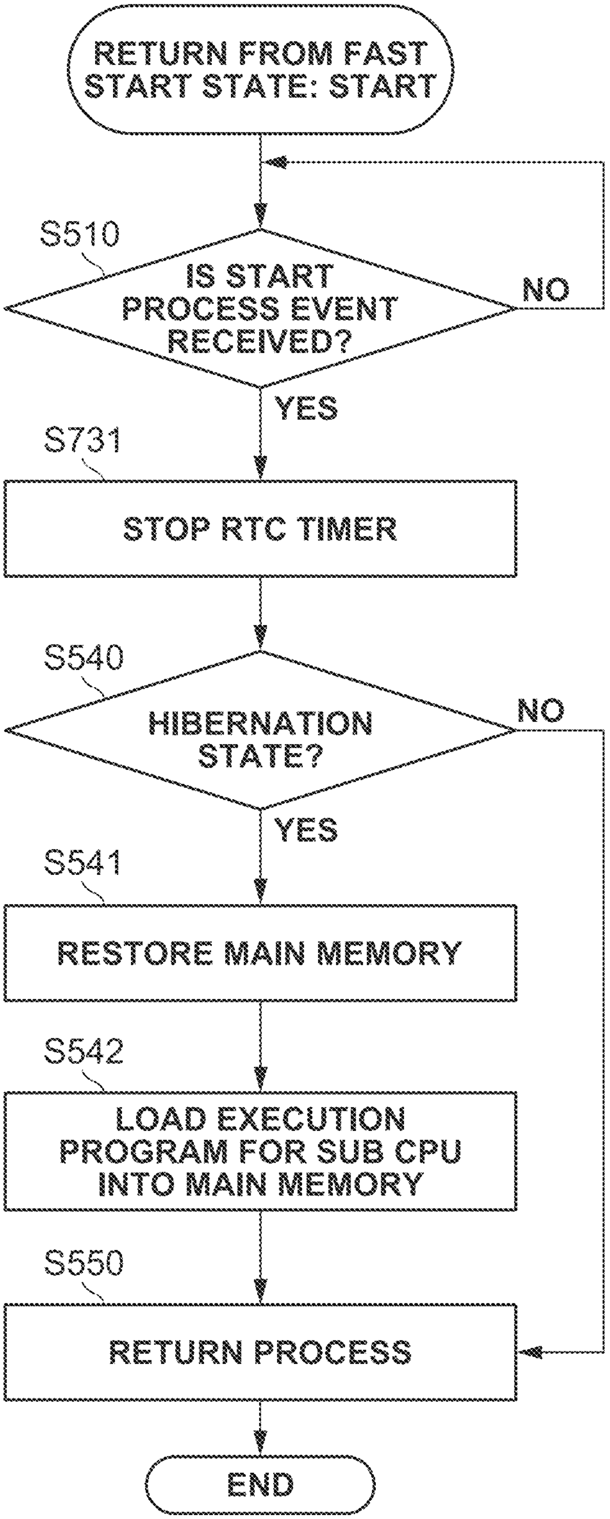
FIG. 7 is a flowchart according to one or more aspects of the present disclosure.

FIGS. 6A and 6B illustrate flowcharts according to the second exemplary embodiment in which the image forming apparatus 101 transitions to hybrid sleep. FIG. 7 illustrates a flowchart according to the second exemplary embodiment in which the image forming apparatus 101 returns from hybrid sleep.

Hybrid sleep is a function obtained by combining suspend and hibernation. In hybrid sleep, if the main CPU 340 receives a transition event for the power state, the main CPU 340 transitions to suspend within a certain time and transitions to hibernation after the certain time or more elapses. Then, when the main CPU 340 receives a return event for the power state, and if the main CPU 340 is turned off for a short time, the main CPU 340 performs suspend and thus can start faster. If the main CPU 340 is turned off for a long time, the main CPU 340 performs hibernation and thus can save more power.

A sequence with an issue will be described. Before the main CPU 340 transitions to the hybrid sleep state, the main CPU 340 loads the execution program for the sub CPU 221 into the outside-OS-management area on the main memory 341, similarly to suspend. When the image forming apparatus 101 returns from the suspend state, the execution program for the sub CPU 221 loaded into the outside-OS-management area on the main memory 341 can be used, and thus, the image forming apparatus 101 can return from suspend. However, if the image forming apparatus 101 returns from the hibernation state, the execution program for the sub CPU 221 loaded into the outside-OS-management area on the main memory 341 is erased by powering off the main memory 341. Thus, the image forming apparatus 101 cannot return from hibernation.

Thus, when the image forming apparatus 101 starts, the main CPU 340 determines whether the image forming apparatus 101 returns from suspend or returns from hibernation in hybrid sleep. If the image forming apparatus 101 returns from hibernation, the main CPU 340 loads the execution program for the sub CPU 221 into the outside-OS-management area of the main memory 341 and further loads the execution program for the sub CPU 221 into the sub memory 223. As described above, this return from hibernation is different from normal return from hibernation in that when the image forming apparatus 101 returns, the main CPU 340 determines whether the previous state is suspend or hibernation.

The flowchart in FIG. 6A will now be described.

The main CPU 340 of the image forming apparatus 101 starts in a waiting state where an end process event can be received. In step S610, the main CPU 340 receives an end process event for the system, such as the detection of the turning off of the power switch 110, which is one of end process events (YES in step S610). The end process events include transition to a waiting state where a fast start can be made, a shutdown, and a reboot.

In step S610, if the received end process event is transition to the waiting state where a fast start can be made, and in step S620, if hybrid sleep is enabled (on) (YES in step S620), the main CPU 340 performs the following processing.

In step S621, the main CPU 340 loads the execution program for the sub CPU 221 into the outside-OS-management area on the main memory 341.

Next, in step S622, the main CPU 340 saves data and information regarding the register of the main CPU 340 in the inside-OS-management area on the main memory 341 in the non-volatile storage device 106. The data saved in the non-volatile storage device 106 is referred to as a “hibernation image”.

Next, in step S623, the main CPU 340 sets the time when the main CPU 340 receives a notification, such as in four hours, in an RTC alarm and starts the RTC alarm.

Next, in step S624, the main CPU 340 notifies the power supply control unit 303. The power supply control unit 303 performs multi-valued control of the power switch 310 to power off the sub CPU 221 and the sub memory 223 and bring the main memory 341 into the self-refreshed state. Consequently, the CPU 340 causes the controller 103 to transition to the suspend state.

In step S610, if the received end process event is transition to the waiting state where a fast start can be made, and in step S620, if hybrid sleep is disabled (off) (NO in step S620), and in step S630, if hibernation is enabled (on) (YES in step S630), the main CPU 340 executes the following processing.

In step S631, the main CPU 340 saves data and information regarding the register of the main CPU 340 in the inside-OS-management area on the main memory 341 in the non-volatile storage device 106. The data saved in the non-volatile storage device 106 is referred to as a “hibernation image”.

Next, in step S632, the main CPU 340 notifies the power supply control unit 303. The power supply control unit 303 performs multi-valued control of the power switch 310 to power off the sub CPU 221 and the sub memory 223 and power off the main memory 341. Consequently, the CPU 340 causes the controller 103 to transition to the hibernation state.

In step S610, the main CPU 340 confirms whether the received end process event is an event corresponding to transition to the waiting state where a fast start can be made. In step S620, the main CPU 340 confirms whether hybrid sleep is disabled (off). In step S630, the main CPU 340 confirms whether hibernation is disabled (off). Further, in step S640, if the suspend is enabled (on) (YES in step S640), the main CPU 340 executes the following processing.

In step S641, the main CPU 340 loads the execution program for the sub CPU 221 into the outside-OS-management area on the main memory 341.

Next, in step S642, the main CPU 340 notifies the power supply control unit 303. The power supply control unit 303 performs multi-valued control of the power switch 310 to power off the sub CPU 221 and the sub memory 223 and bring the main memory 341 into the self-refreshed state. Consequently, the CPU 340 causes the controller 103 to transition to the suspend state.

If the received end process event is not transition to the waiting state where a fast start can be made, and is a shutdown or a reboot (YES in step S610, NO in step S620, NO in step S630, and NO in step S640), the main CPU 340 performs an end process.

In step S650, the main CPU 340 notifies the power supply control unit 303. The power supply control unit 303 powers off the sub CPU 221 and the sub memory 223 and powers off the main memory 341. Consequently, the CPU 340 causes the controller 103 to transition to the end state.

A supplementary description will be given of the flowchart of entry to hybrid sleep in FIG. 6A.

The end process event for the system (step S610) is not limited to the turning off of the power switch 110. The end process event can be in any form. For example, the CPU 340 can start the processing based on a system operation, or based on an event received from the computer 109 via the LAN 108 or via the telephone line. Examples of the system operation include an auto shutdown timer and an auto shutdown time by the RTC 212 and an external remote shutdown. The descriptions of these examples, however, are digressive, and thus are omitted.

The determination of whether the hybrid sleep function is enabled (on) (step S620) can be made by the main CPU 340 referring to the flag for enabling and disabling the hybrid sleep function. The flag for enabling and disabling hybrid sleep is a system initial setting value or is saved in the non-volatile storage device 106 or a memory by the user providing an input to the operation unit 105. The determination of whether hybrid sleep is enabled (on) (step S620) can also be made with information regarding the flag included in the end process event for the system received by the main CPU 340 (step S610). These determinations are not limited to hybrid sleep, and can also be similarly made regarding another function, such as hibernation or suspend. However, this is digressive, and thus is not described.

The flowchart in FIG. 6B will now be described.

The main CPU 340 of the image forming apparatus 101 starts in a waiting state where an RTC timer expiration event can be received after the image forming apparatus 101 transitions to suspend based on the hybrid sleep setting. If a specified time elapses in the suspend state, then in step S680, the main CPU 340 receives a timer expiration event from the RTC 212 (YES in step S680). Next, in step S690, the main CPU 340 turns off the supply of power to transition to hibernation. The main CPU 340 notifies the power supply control unit 303. The power supply control unit 303 powers off the sub CPU 221 and the sub memory 223 and powers off the main memory 341. Consequently, since the hibernation image is already saved in step S621, then in step S690, the main CPU 340 causes the controller 103 to transition to the hibernation state. In the present exemplary embodiment, a description has been given using a timer expiration event as an example of a trigger for transition from the suspend state to the hibernation state. The present disclosure, however, is not limited to this. For example, a configuration can be employed in which the long press of a tactile switch as a type of the power switch 110 is detected as a predetermined condition, whereby the image forming apparatus 101 transitions from the suspend state to the hibernation state.

Examples of the power switch 110 include a variety of switches, such as a push switch in which two states, namely on and off states, can be distinguished from outside, a toggle switch in which a lever is brought down, and a rocker switch in which a seesaw is brought down in one direction. Examples of the power switch 110 also include a tactile switch and a slide switch that detect a push or a slide, that if the push or the slide is released, returns to the original state, and that can represent both on and off states such that the on and off states cannot be distinguished from outside, or can be long-pressed or -slid. The above state transition can also be achieved using a variety of types of power switches 110, such as the tactile switch and the slide switch. However, this is digressive, and thus is not described.

A supplementary description will be given of the flowchart of entry to hybrid sleep in FIG. 6B.

The timer expiration event can be the return from an interrupt due to the expiration of the RTC timer.

A form can also be employed in which the main CPU 340 does not receive a notification of the expiration of the RTC timer, but the power supply control unit 303 directly receives a signal notification and performs multi-valued control of the power switch 310 to stop the feeding of power to components of the controller 103. In this case, the RTC timer can be the RTC 212 from which the CPU 340 receives a signal notification, or may be another RTC from which the power supply control unit 303 receives a notification. However, this is digressive, and thus is not described in detail.

FIG. 7 illustrates a flowchart according to the second exemplary embodiment in which the image forming apparatus 101 returns from hybrid sleep. The flowchart in FIG. 7 will now be described.

The main CPU 340 of the image forming apparatus 101 starts in a waiting state where a start event can be received, i.e., the fast start mode or the power-off state.

In step S510, the main CPU 340 receives a return process event for the system (YES in step S510). That is, in step S510, if the power switch 110 is turned on, the power supply control unit 303 starts a start process of the main CPU 340.

Next, in step S731, the main CPU 340 clears the setting of the RTC return time.

Next, in step S540, the main CPU 340 determines whether the image forming apparatus 101 returns from the hibernation state. If the image forming apparatus 101 returns from the hibernation state (Yes in step S540), then in step S541, the main CPU 340 loads a hibernation image saved in the non-volatile storage device 106 before hibernation into the inside-OS-management area on the memory 341 for the main CPU 340 and restores the register of the main CPU 340.

Next, in step S542, the main CPU 340 loads the execution program for the sub CPU 221 into the outside-OS-management area on the main memory 341. Then, the main CPU 340 DMA-transfers the execution program for the sub CPU 221 in the outside-OS-management area to the sub memory 223 and clears the reset of the sub CPU 221. As a result, in step S550, the sub CPU 221 reads the program in the sub memory 223 and starts.

On the other hand, if the image forming apparatus 101 does not return from the hibernation state (No in step S540), the image forming apparatus 101 returns from the suspend state. Thus, the processing proceeds to step S550.

A supplementary description will be given of the flowchart of return from hybrid sleep in FIG. 7.

The start process event for the system (step S510) is not limited to the turning on of the power switch 110. The start process event can be in any form. For example, the CPU 340 can start the processing based on a system operation, or based on an event received from the computer 109 via the LAN 108 or via the telephone line. Examples of the system operation include an auto boot timer and an auto boot time by the RTC 212 and an external remote boot. As for the RTC 212, a single RTC can give different interrupt notifications, such as a timer and an alarm, and a plurality of RTCs can also be mounted as hardware. Thus, the RTC return in which the elapsed time of suspend is determined and another RTC return can be distinguished. The descriptions of these examples, however, are digressive, and thus are omitted.

Examples of the method for determining whether the power state before the return is the hibernation state (step S540) include the determination of the elapsed time from the transition to the state where a fast start can be made to the return. Examples of the method further include the determination of the presence or absence of the setting of enabling or disabling hibernation, the determination of the presence or absence of a hibernation image, and the determination of the presence or absence of the flag in the non-volatile storage device 106.

Effects of Second Exemplary Embodiment

As effects of the second exemplary embodiment, with the configuration of the main CPU 340 and the sub CPU 221, the main CPU 340 determines whether the image forming apparatus 101 returns from suspend or hibernation in hybrid sleep. The sub CPU 221 normally starts an execution program, whereby the controller 103 can start fast from both suspend and hibernation.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-104673, filed Jun. 27, 2023, which is hereby incorporated by reference herein in its entirety.

What is claimed is:

1. An image forming apparatus including a first controller and a second controller that at least perform image processing, and a memory, the image forming apparatus being capable of transitioning to a standby state, a suspend state that is a power saving state where current is applied to the memory and a fast start can be made, and a hibernation state that is a power saving state where current is not applied to the memory, the image forming apparatus comprising:

the first controller configured to, in a case where the first controller receives an end process event, cause the image forming apparatus to transition to a power saving state, wherein in a case where the first controller determines that transition to the hibernation state is enabled, the first controller performs control to cause the image forming apparatus to transition to the hibernation state, and wherein in a case where the first controller determines that transition to the suspend state is enabled, the first controller performs control to:

load a program for the second controller into an outside-operating-system (OS)-management area on the memory, turn off application of current to the second controller, and cause the image forming apparatus to transition to the suspend state.

2. The image forming apparatus according to claim 1, further comprising a non-volatile storage unit, wherein in a case where the first controller determines that transition to the hibernation state is enabled, the first controller performs control to save data in an inside OS management area on the memory in the storage unit and turn off application of current to the memory and the second controller.

3. The image forming apparatus according to claim 1, further comprising a power supply controller configured to at least control supply of power to the second controller and the memory, wherein in a case where the first controller notifies the power supply controller that the image forming apparatus is to transition to the hibernation state, the power supply controller performs control not to supply power to the second controller and the memory.

4. The image forming apparatus according to claim 3, wherein in a case where the first controller notifies the power supply controller that the image forming apparatus is to transition to the suspend state, the power supply controller performs control not to supply power to the second controller.

5. The image forming apparatus according to claim 1, further comprising the second controller configured to, in a case where the second controller receives a return process event, return the image forming apparatus from a power saving state to the standby state, wherein in a case where the image forming apparatus returns from the suspend state, the second controller performs control to return the image forming apparatus to the standby state by the second controller reading the program loaded into the memory before the transition to the suspend state.

6. The image forming apparatus according to claim 1, further comprising the second controller configured to, in a case where the second controller receives a return process event, return the image forming apparatus from a power saving state to the standby state, wherein in a case where the image forming apparatus returns from the hibernation state, the second controller performs control to return the image forming apparatus to the standby state by loading the program for the second controller into the memory after current is applied to the memory, and reading the loaded program.

7. The image forming apparatus according to claim 1, further comprising a power switch, wherein the end process event is received by detecting turning off of the power switch, and a return process event is received by detecting turning on of the power switch.

8. An image forming apparatus including a first controller and a second controller that at least perform image processing, a third controller, and a memory, the image forming apparatus being capable of transitioning to a standby state, a suspend state that is a power saving state where current is applied to the memory and a fast start can be made, and a hibernation state that is a power saving state where current is not applied to the memory, the image forming apparatus comprising:

the first controller configured to, in a case where the first controller receives an end process event, perform control to load a program for the second controller into the memory and cause the image forming apparatus to transition to the suspend state;

the second controller configured to, in a case where the image forming apparatus transitions to the suspend state and a predetermined condition is satisfied, perform control to cause the image forming apparatus to transition to the hibernation state; and the third controller configured to, in a case where the third controller receives a return process event, return the image forming apparatus from a power saving state to the standby state, wherein in a case where the third controller determines that the image forming apparatus is to return from the hibernation state, the third controller performs control to load the program for the second controller into the memory after current is applied to the memory and return the image forming apparatus to the standby state by the second controller reading the loaded program.

9. The image forming apparatus according to claim 8, further comprising a power supply controller configured to at least perform control supply of power to the second controller and the memory, wherein in a case where the first controller receives the end process event, the first controller performs control to load the program for the second controller into the memory and notify the power supply controller that the image forming apparatus is to transition to the suspend state, and wherein the power supply controller having received the notification performs control not to supply power to the second controller.

10. The image forming apparatus according to claim 9, further comprising a non-volatile storage unit, wherein in a case where the image forming apparatus transitions to the suspend state and a predetermined condition is satisfied, the second controller performs control to save data in an inside-OS-management area on the memory in the storage unit and notify the power supply controller that the image forming apparatus is to transition to the hibernation state, and wherein the power supply controller having received the notification performs control not to supply power to the second controller and the memory.

11. The image forming apparatus according to claim 8, further comprising a timer, wherein in a case where the third controller receives the return process event, the third controller performs control to stop the timer.

12. The image forming apparatus according to claim 8, further comprising the third controller configured to, in a case where the third controller receives the return process event, return the image forming apparatus from a power saving state to the standby state, wherein in a case where the third controller determines that the image forming apparatus is to return from the suspend state, the third controller performs control to return the image forming apparatus to the standby state by the second controller reading the program loaded into the memory before the image forming apparatus transitions to the suspend state.

13. The image forming apparatus according to claim 8, further comprising:

a setting unit configured to set enabling of a hybrid sleep function for transitioning to the hibernation state in a case where a predetermined time elapses after the image forming apparatus transitions to the suspend state; and a timer, wherein in a case where the first controller receives the end process event, and in a case where the hybrid sleep function is enabled, the first controller performs control to start the timer immediately before the image forming apparatus transitions to the suspend state.

14. The image forming apparatus according to claim 8, further comprising a power switch, wherein the end process event is received by detecting turning off of the power switch, and the return process event is received by detecting turning on of the power switch.

15. A control method for controlling an image forming apparatus including a first controller and a second controller that at least perform image processing, and a memory, the image forming apparatus being capable of transitioning to a standby state, a suspend state that is a power saving state where current is applied to the memory and a fast start can be made, and a hibernation state that is a power saving state where current is not applied to the memory, the control method comprising:

receiving an end process event, in a case where it is determined that transition to the hibernation state is enabled, performing control to cause the image forming apparatus to transition to the hibernation state, and in a case where it is determined that transition to the suspend state is enabled, performing control to:

load a program for the second controller into an outside-OS-management area on the memory, turn off application of current to the second controller, and cause the image forming apparatus to transition to the suspend state.

16. A control method for controlling an image forming apparatus including a first controller and a second controller that at least perform image processing, and a memory, the image forming apparatus being capable of transitioning to a standby state, a suspend state that is a power saving state where current is applied to the memory and a fast start can be made, and a hibernation state that is a power saving state where current is not applied to the memory, the control method comprising:

in a case where an end process event is received, performing control to load a program for the second controller into the memory and cause the image forming apparatus to transition to the suspend state;

in a case where a predetermined time elapses after the image forming apparatus transitions to the suspend state, performing control to cause the image forming apparatus to transition to the hibernation state;

in a case where a return process event is received, returning the image forming apparatus from a power saving state to the standby state, and in a case where the image forming apparatus is to return from the hibernation state, loading the program for the second controller into the memory after current is applied to the memory and returning the image forming apparatus to the standby state by the second controller reading the loaded program.

* * * * *